US008767228B2

(12) United States Patent
Fei

(10) Patent No.: US 8,767,228 B2
(45) Date of Patent: Jul. 1, 2014

(54) OPERATION CONTROL METHOD FOR AN IMAGE FORMING APPARATUS

(75) Inventor: Xue Fei, Shanghai (CN)

(73) Assignee: Ricoh Company, Ltd., Tokyo (JP)

( * ) Notice: Subject to any disclaimer, the term of this patent is extended or adjusted under 35 U.S.C. 154(b) by 155 days.

(21) Appl. No.: 13/402,441

(22) Filed: Feb. 22, 2012

(65) Prior Publication Data

US 2012/0218583 A1 Aug. 30, 2012

(30) Foreign Application Priority Data

Feb. 25, 2011 (CN) .......................... 2011 1 0054256

(51) Int. Cl.
*G06F 3/12* (2006.01)
*G06K 15/02* (2006.01)

(52) U.S. Cl.
USPC .......................................... 358/1.13; 358/1.1

(58) Field of Classification Search
USPC ............ 358/1.1, 1.13, 1.14, 1.15; 347/22, 84, 347/220; 399/34, 88
See application file for complete search history.

(56) References Cited

U.S. PATENT DOCUMENTS

| | | | | |
|---|---|---|---|---|
| 2009/0074430 | A1* | 3/2009 | Nakazato et al. | 399/13 |
| 2010/0254726 | A1* | 10/2010 | Endo | 399/69 |

* cited by examiner

*Primary Examiner* — Gabriel Garcia
(74) *Attorney, Agent, or Firm* — Harness, Dickey & Pierce, P.L.C.

(57) ABSTRACT

The present invention provides an operation controlling method of an image forming apparatus and an image forming apparatus using the said operation controlling method. The image forming apparatus is provided with a main controlling unit and a development unit, wherein a first information is stored in the development unit, and the main controlling unit determines an operation controlling on the image forming apparatus based on the first information when a power source is turned from OFF to ON in a state of when a cover of the image forming apparatus is closed or when the cover of the image forming apparatus is changed from open to closed in a state of when the power source is ON.

10 Claims, 7 Drawing Sheets

OPERATION CONTROL METHOD FOR AN IMAGE FORMING APPARATUS

BACKGROUND OF THE INVENTION

1. Field of the Invention

The present invention relates to an operation controlling method of an image forming apparatus and an image forming apparatus using the said operation controlling method.

2. Description of the Related Art

The usual image forming apparatus is generally provided with a demountable development unit. The development unit generally includes a photoreceptor, a developing roller, a charging roller, a toner compartment, a cleaning part, and a memory, etc.

For improvement on image forming quality and function of the image forming apparatus, an improvement operation on the component of the development unit is generally performed. For example, an improvement on the toner in the toner compartment is performed, or an improvement on other components of the development unit is performed.

For making other components of the image forming apparatus to be in an optimal operating condition in response, the operation parameter information of other components of the development unit and other components of the image forming apparatus will also be changed, when the improvement on one component of the development unit is performed. For example, a developing bias applied to a developing roller by a voltage generator and a fixation temperature of a fixation roller will also be changed in response, if the toner in the toner compartment of the development unit is improved.

In the prior technologies, it is necessary to make every component of the image forming apparatus perform the image forming operation in response to a situation after which the development unit is improved, by modifying a software in the image forming apparatus, after the improvement operation on the development unit is performed.

However, it is always necessary to modify the software in the image forming apparatus every time an improvement operation on the development unit is performed, thereby causing improvement operations on the image forming apparatus to be very complicated and hard to use for a user.

SUMMARY OF THE INVENTION

The present invention is made in light of the problems, and may provide an operation controlling method of an image forming apparatus provided with a main controlling unit and a development unit, wherein a first information is stored in the development unit, and the main controlling unit determines an operation controlling on the image forming apparatus based on the first information when a power source is turned from OFF to ON in a state of when a cover of the image forming apparatus is closed or when the cover of the image forming apparatus is changed from open to closed in a state of when the power source is ON.

The present invention may also provide an image forming apparatus using the said operation controlling method.

According to the operation controlling method of the image forming apparatus and the image forming apparatus of the present invention, the image forming apparatus can determine the operation controlling on the image forming apparatus based on the first information without modifying the software in the image forming apparatus after the improvement operation on the development unit is performed, thereby improving operability of the improvement operation on the image forming apparatus.

DETAILED DESCRIPTION OF THE PREFERRED EMBODIMENTS

In the following, embodiments of the present invention are described with reference to the accompanying drawings.

Figure 1:
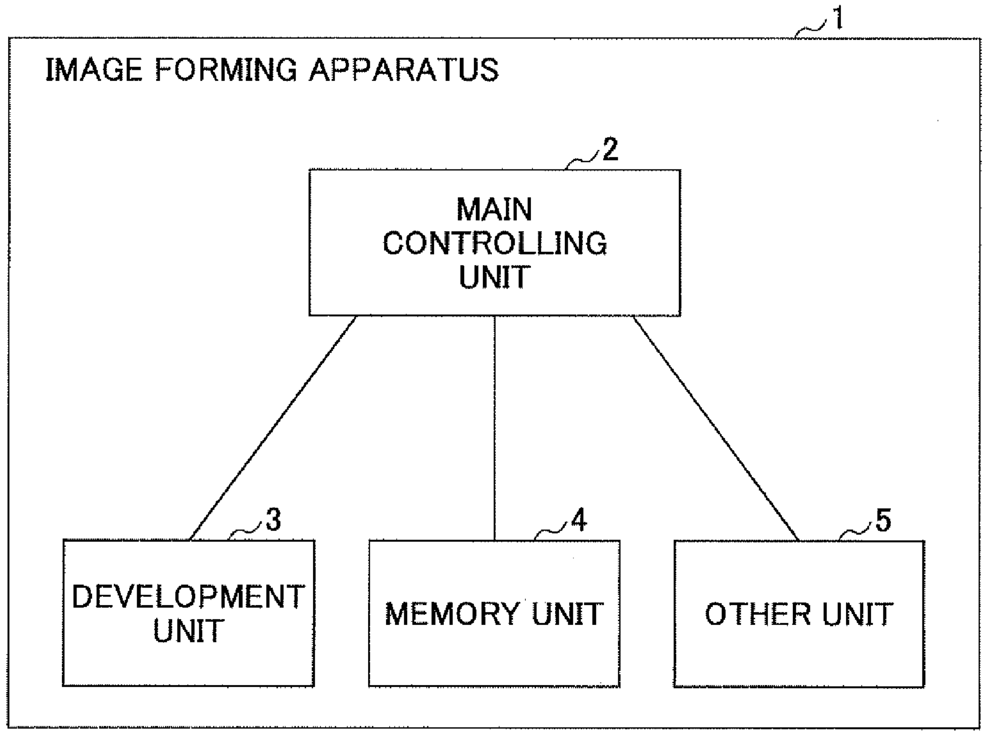
FIG. 1 is an overall block diagram illustrating the image forming apparatus according to the present invention.

First, FIG. 1 is an overall block diagram illustrating the image forming apparatus according to the present invention. As illustrated in FIG. 1, an image forming apparatus 1 of the present invention includes a main controlling unit 2, a development unit 3, a memory unit 4, and other unit 5.

Figure 2:
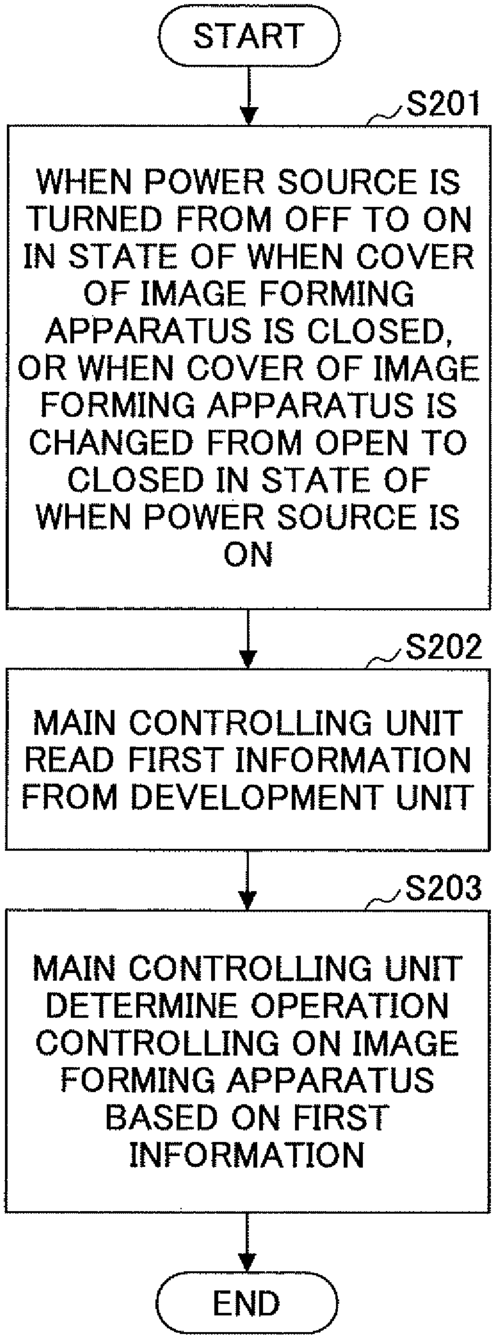
FIG. 2 is a flowchart illustrating the operation controlling process of the image forming apparatus according to the present invention.

FIG. 2 is a flowchart illustrating the operation controlling process of the image forming apparatus 1 according to the present invention. In every embodiment of the present invention, a first information is stored in the development unit 3, and when a power source is turned from OFF to ON in a state of when a cover of the image forming apparatus 1 is closed or when the cover of the image forming apparatus 1 is changed from open to closed in a state of when the power source is ON (step S201), the main controlling unit 2 reads the first information from the development unit 3 (step S202) and determines the operation controlling on the image forming apparatus 1 based on the first information (step S203).

In the following, a detailed description of step S203, that is, the step that the main controlling unit 2 determines the operation controlling on the image forming apparatus 1 based on the first information in each embodiment are provided with reference to the accompanying FIG. 3 to FIG. 7.

In the prior technologies, a high degree of storage capability of the development unit 3 is necessary if the amount of the operation parameter information is too large, because all operation parameter information of every component of the development unit 3 is stored in the development unit 3; besides, it is necessary to read the operation parameter information from the development unit 3 to the memory unit 4 of the image forming apparatus 1, thus not only is a high degree of storage capability of the memory unit 4 necessary, thereby raising the cost of the whole image forming apparatus 1, but also the load of data transferring and processing of the image forming apparatus 1 is increased and efficiency of data transferring and processing is decreased because of the read operations on high volume data. The first embodiment of the present invention is provided in light of the above problems.

Figure 3:
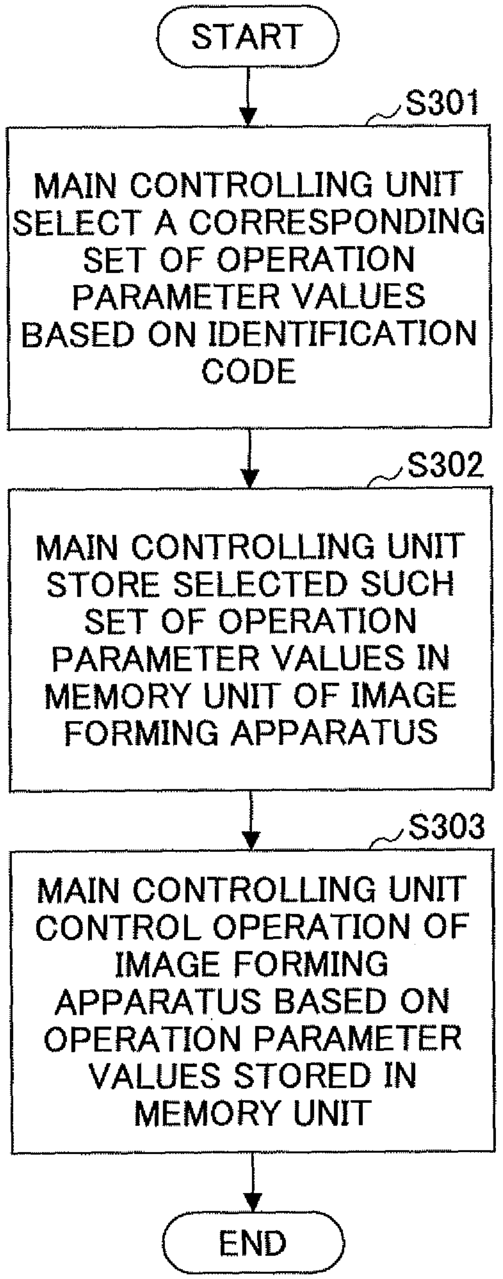
FIG. 3 is a flowchart illustrating the process for determining the operation controlling on the image forming apparatus according to the first embodiment of the present invention.
Figure 4:
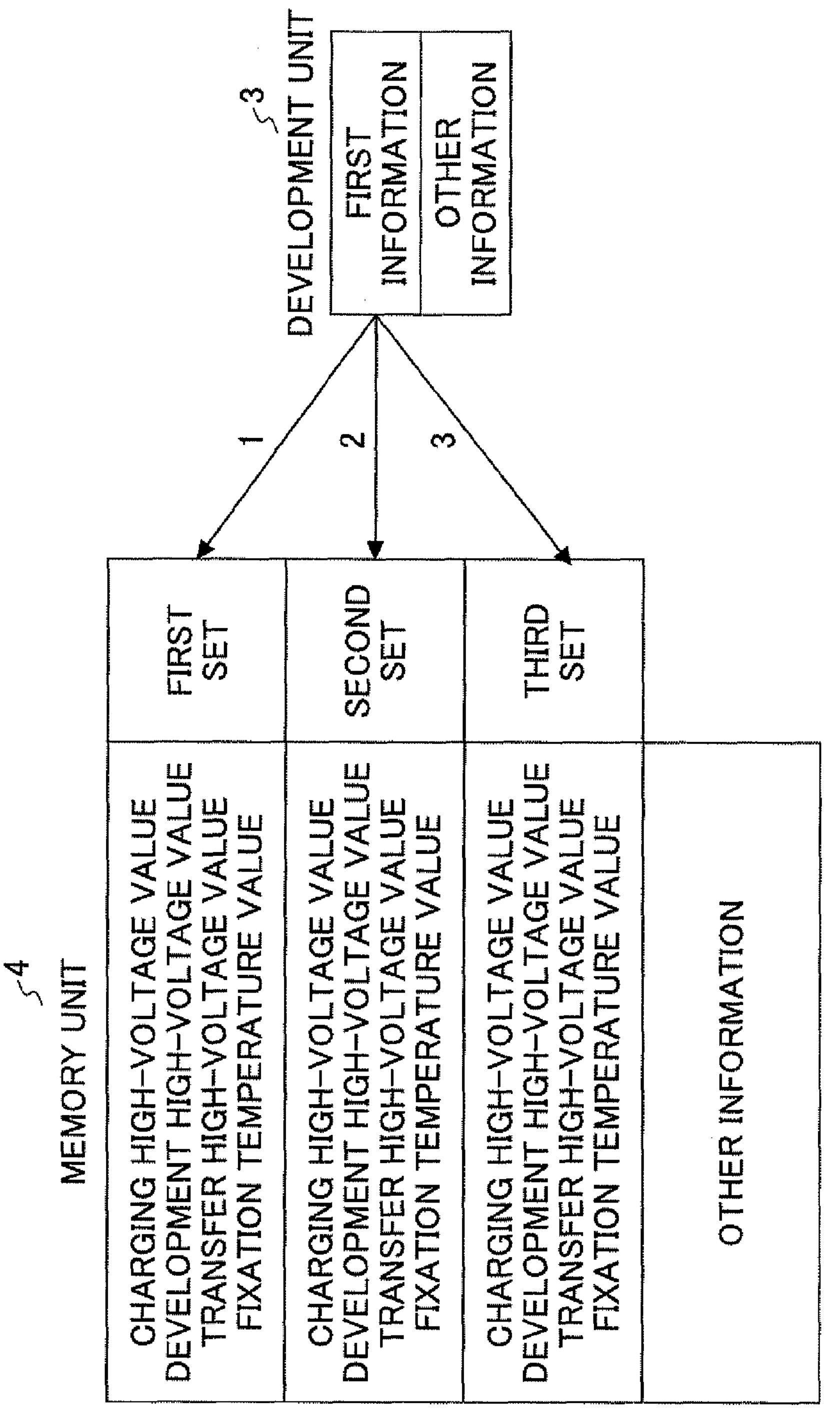
FIG. 4 is a drawing illustrating the correspondence of plural sets of operation parameter values stored in the memory unit to the first information stored in the development unit.

FIG. 3 and FIG. 4 illustrate the first embodiment of the operation controlling method of the image forming apparatus 1 of the present invention. FIG. 3 is a flowchart illustrating the process for determining the operation controlling on the image forming apparatus according to the first embodiment of the present invention; and FIG. 4 is a drawing illustrating the correspondence of plural sets of operation parameter values stored in the memory unit 4 to the first information stored in the development unit 3.

As illustrated in FIG. 4, plural sets of operation parameter values for controlling the operation of the image forming apparatus 1 are stored in the memory unit 4 of the image forming apparatus 1. Each set of operation parameter values include a charging high-voltage value, a development high-voltage value, a transfer high-voltage value, and a fixation temperature value. The first information includes a selection information corresponding to a set of operation parameter values in the plural sets of operation parameter values. For example, the selection information in the first information is an identification code.

As illustrated in FIG. 3, in the first embodiment, the steps which the main controlling unit 2 determines the operation controlling on the image forming apparatus 1 based on the first information are as follows.

The main controlling unit 2 selects a corresponding set of operation parameter values from the plural sets of operation parameter values based on the selection information, namely the identification code (step S301). For example, the main controlling unit 2 selects the first set of operation parameter values from the plural sets of operation parameter values if the identification code is 1, and the main controlling unit 2 selects the second set of operation parameter values from the plural sets of operation parameter values if the identification code is 2, and so on.

Then, the main controlling unit 2 controls the operation of the image forming apparatus 1 based on the selected set of operation parameter values. The said operation may be performed by the following steps. The main controlling unit 2 stores the selected set of operation parameter values in the memory unit 4 of the image forming apparatus 1 (step S302); and the main controlling unit 2 controls the operation of the image forming apparatus 1 based on the set of operation parameter values stored in the memory unit 4, namely the set of operation parameter values selected by the main controlling unit 2 at step S301, when the image forming apparatus 1 receives a request of image forming (step S303).

Although only three sets of operation parameter values are stored in the image forming apparatus 1 as illustrated in FIG. 4, the present invention is not limited to that. It is obvious for those skilled in the art that any sets of operation parameter values, for example at least one set of operation parameter values may be stored in the image forming apparatus 1, as necessary.

The technical effect of the first embodiment of the present invention is as follows. According to the first embodiment of the present invention, not only can the requirement for the storage capability of the development unit 3 be reduced, thereby reducing the cost of the whole image forming apparatus 1, but also the load of the data transferring and processing in the image forming apparatus 1 can be greatly reduced, thereby improving the efficiency of the data transferring and processing of the whole image forming apparatus 1. This is because not the specific operation parameter values, but only the identification code is stored in the development unit 3 and the main controlling unit 2 which can control the operation of the image forming apparatus 1 by reading not the specific operation parameter values, but only the identification code from the development unit 3.

Furthermore, if the image forming apparatus 1 performs the image forming operation based on the operation parameter values after improvement, when such operation parameter values after improvement are not in the predetermined range of normal operation of the image forming apparatus 1 after the development unit 3 is improved, it would be possible that the image forming apparatus 1 is out of normal operation, and even cause damage to the image forming apparatus 1. For example, if the image forming apparatus 1 controls a high-voltage power source to work based on the operation parameter values after improvement, when the operation parameter values such as a high-voltage controlling information after improvement is not in the range of normal working of the high-voltage power source of the image forming apparatus 1, it might cause damage to the image forming apparatus 1. The second embodiment and the third embodiment of the present invention are made in light of the problems on the basis of every embodiment of the present invention.

Next, the second embodiment of the present invention is described with reference to the accompanying FIG. 5.

Figure 5:
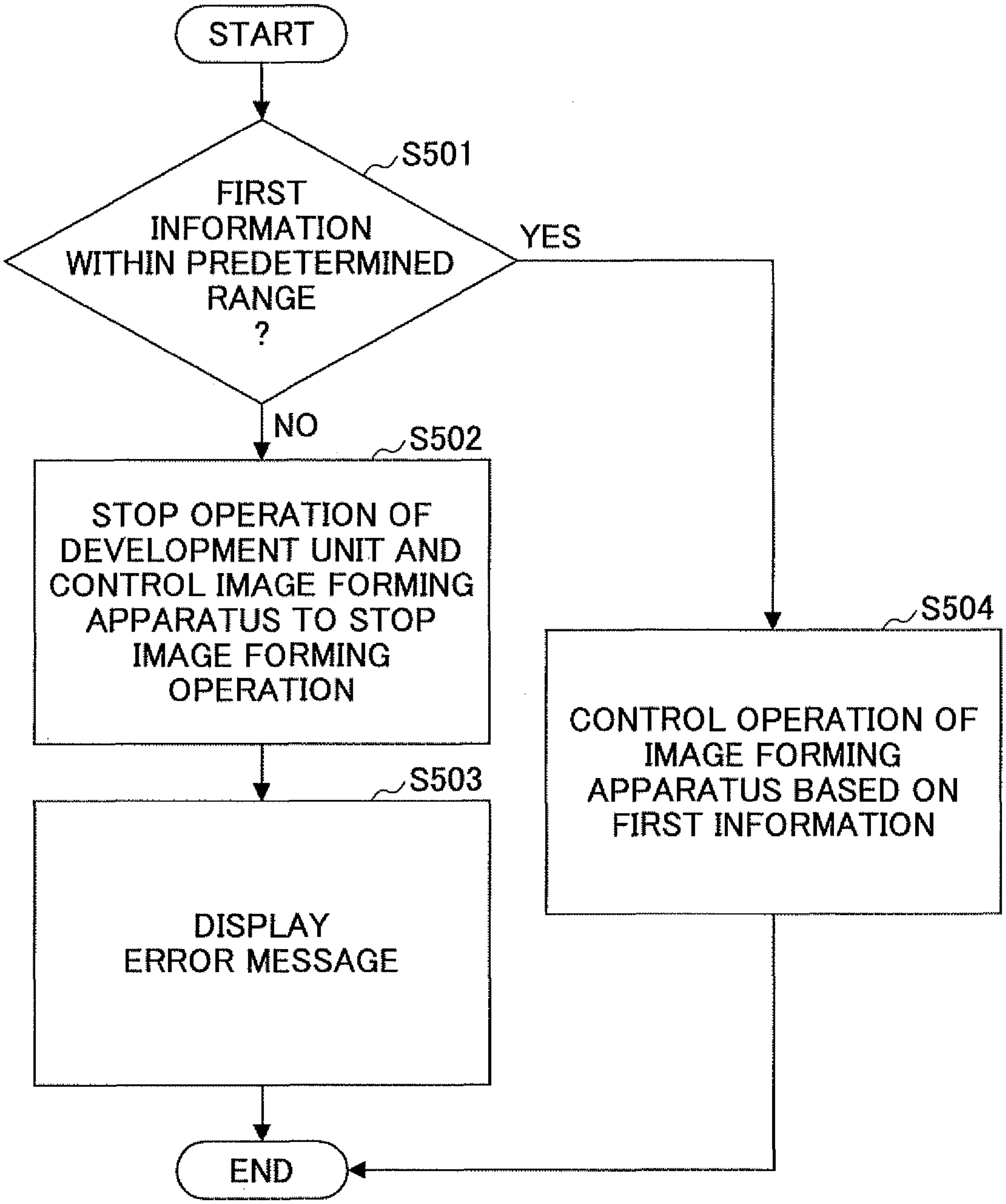
FIG. 5 is a flowchart illustrating the process for determining the operation controlling on the image forming apparatus according to the second embodiment of the present invention.

FIG. 5 is a flowchart illustrating the process for determining the operation controlling on the image forming apparatus according to the second embodiment of the present invention.

In the second embodiment, the first information includes at least one operation parameter value for controlling the operation of the image forming apparatus 1. A predetermined value range predetermined for each operation parameter corresponding to the at least one operation parameter value is stored in the image forming apparatus 1, for example, the predetermined value range is a value range for normal operation of the image forming apparatus 1.

As illustrated in FIG. 5, in the second embodiment, the steps which the main controlling unit 2 determines the operation controlling on the image forming apparatus 1 based on the first information are as follows.

The main controlling unit 2 determines whether each value in the at least one operation parameter value is in the predetermined value range of the operation parameter corresponding to the each value or not (step S501).

The main controlling unit 2 stops an operation of the development unit 3 and controls the image forming apparatus 1 to stop an image forming operation (step S502), and makes the image forming apparatus 1 display an error message to the user (step S503) thereby making the user do a manual handling based on the error message, when at least one value in the at least one operation parameter value is not in the predetermined value range of the operation parameter corresponding to the at least one value.

On the other hand, the main controlling unit 2 controls the operation of the image forming apparatus 1 based on the at least one operation parameter value, when the each value in the at least one operation parameter value is in the predetermined value range of the operation parameter corresponding to the each value (step S504).

Next, the third embodiment of the present invention is described with reference to the accompanying FIG. 6.

Figure 6:
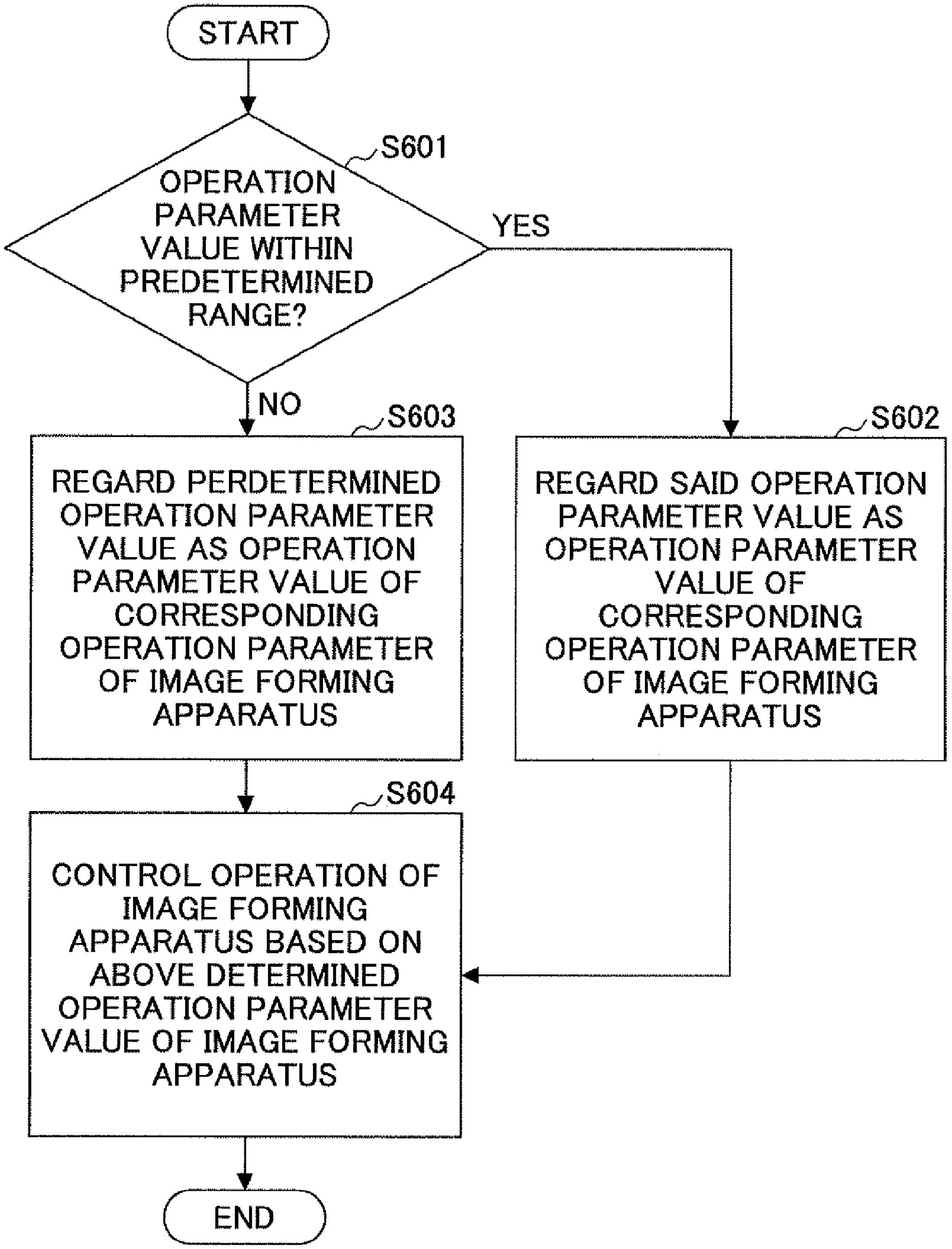
FIG. 6 is a flowchart illustrating the process for determining the operation controlling on the image forming apparatus according to the third embodiment of the present invention.

FIG. 6 is a flowchart illustrating the process for determining the operation controlling on the image forming apparatus according to the third embodiment of the present invention.

In the third embodiment, the first information includes at least one operation parameter value for controlling the operation of the image forming apparatus 1. In the image forming apparatus 1, a predetermined value range is predetermined for each operation parameter corresponding to the at least one operation parameter value, and a predetermined operation parameter value is predetermined for each operation parameter corresponding to the at least one operation parameter value, and each predetermined operation parameter value is in the predetermined value range of the operation parameter corresponding to the each predetermined operation parameter value.

As illustrated in FIG. 6, in the third embodiment, the steps which the main controlling unit 2 determines the operation controlling on the image forming apparatus 1 based on the first information are as follows.

The main controlling unit 2 determines whether each value in the at least one operation parameter value is in the predetermined value range of the operation parameter corresponding to the each value or not (step S601).

The main controlling unit 2 regards a value in the at least one operation parameter value as the operation parameter value of a corresponding operation parameter of the image forming apparatus 1, when the value in the at least one operation parameter value is in the predetermined value range of the corresponding operation parameter (step S602).

On the other hand, the main controlling unit 2 regards the predetermined operation parameter value corresponding to the corresponding operation parameter as the operation parameter value of the corresponding operation parameter of the image forming apparatus 1, when the value in the at least one operation parameter value is not in the predetermined value range of the corresponding operation parameter (step S603).

Then, the main controlling unit 2 controls the operation of the image forming apparatus 1 based on all determined operation parameter values of the image forming apparatus 1 (step S604). A specific operation may be performed by the following method. The main controlling unit 2 stores all determined operation parameter values in the memory unit 4 of the image forming apparatus 1; and the main controlling unit 2 controls the operation of the image forming apparatus 1 based on the set of operation parameter values stored in the memory unit 4, namely the set of operation parameter values selected by the main controlling unit 2 at the above step, when the image forming apparatus 1 receives a request of image forming.

The technical effects of the second embodiment and the third embodiment of the present invention are as follows. According to the second embodiment and the third embodiment of the present invention, the image forming apparatus 1 makes a judgment on the received operation parameter values after improvement, after the development unit 3 is improved. Therefore, damage of the image forming apparatus 1 can be avoided, when the received operation parameter values after improvement are abnormal.

Furthermore, not only the modification of the operation parameter values but also the modification of a mode control on the image forming apparatus 1 are related to the improvement of the development unit 3. For example, the mode control on a cleaning unit might be modified; however no solution is provided for such situation in the prior technologies. The fourth embodiment of the present invention is made in light of the problems on the basis of every embodiment of the present invention.

Next, the fourth embodiment of the present invention is described with reference to the accompanying FIG. 7.

Figure 7:
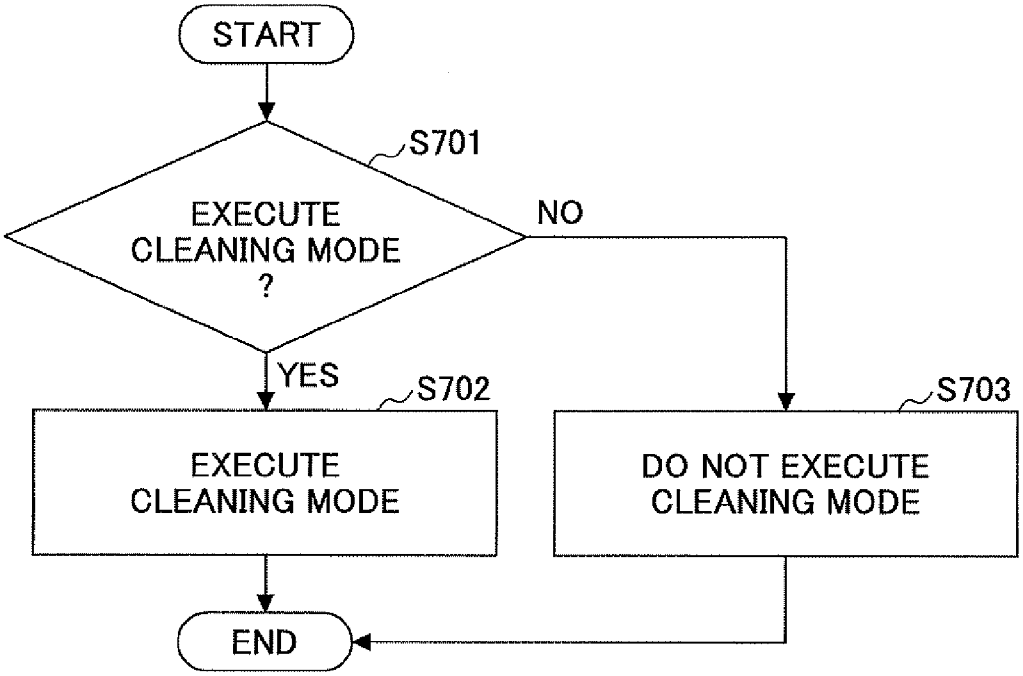
FIG. 7 is a flowchart illustrating the process for determining the operation controlling on the image forming apparatus according to the fourth embodiment of the present invention.

FIG. 7 is a flowchart illustrating the process for determining the operation controlling on the image forming apparatus according to the fourth embodiment of the present invention.

In the fourth embodiment, the first information includes a mode control information of the image forming apparatus 1. The main controlling unit 2 determines the operation controlling on the image forming apparatus 1 based on the mode control information. For example, the mode control information may include a mode control information for determining whether a cleaning mode is executed or not.

The main controlling unit 2 determines whether the cleaning mode is executed or not based on the first information, when the first information is the mode control information for determining whether the cleaning mode is executed or not (step S701). Concretely, the main controlling unit 2 controls the image forming apparatus 1 to execute a cleaning operation, if the mode control information is set for determining the cleaning mode is executed (step S702); on the other hand, the main controlling unit 2 does not control the image forming apparatus 1 to execute the cleaning operation, if the mode control information is set for determining the cleaning mode is not to be executed (step S703).

The technical effect of the fourth embodiment of the present invention is as follows. Not only the operation parameter values of the image forming apparatus 1, but also the mode control method of the image forming apparatus 1 can be modified in response after the development unit 3 is improved. Therefore, the image forming apparatus 1 can modify the mode control method of the image forming apparatus 1 in response to the improved development unit 3.

Each technical effect described above can be achieved, when the operation control methods of the above embodiments are used in the image forming apparatus 1. Each embodiment described above can be combined together.

The operation parameter in the present invention means the operation parameter for performing each component of the image forming operation in the image forming apparatus 1. Such operation parameter values include the charging high-voltage value, the development high-voltage value, the transfer high-voltage value, or the fixation temperature value; however it is not limited to those described above.

The present invention is not limited to the specifically disclosed embodiments, and variations and modifications may be made without departing from the scope of the present invention.

The present application is based on Chinese Priority Application No. 201110054256.7 filed on Feb. 25, 2011, the entire contents of which are hereby incorporated herein by reference.

What is claimed is:

1. An operation controlling method of an image forming apparatus provided with a main controlling unit and a development unit, storing a first information in the development unit, wherein the first information includes an identification code; and determining, by the main controlling unit, an operation controlling on the image forming apparatus based on the first information when a power source is turned from OFF to ON in a state of when a cover of the image forming apparatus is closed or when the cover of the image forming apparatus is changed from open to closed in a state of when the power source is ON.

2. The operation controlling method of the image forming apparatus according to claim 1, wherein plural sets of operation parameter values for controlling an operation of the image forming apparatus are stored in the image forming apparatus, and the first information includes a selection information corresponding to a set of operation parameter values in the plural sets of operation parameter values, wherein as the steps which the main controlling unit determines the operation controlling on the image forming apparatus based on the first information, the main controlling unit selects a corresponding set of operation parameter values from the plural sets of operation parameter values based on the selection information and the main controlling unit controls the operation of the image forming apparatus based on the selected set of operation parameter values.

3. The operation controlling method of the image forming apparatus according to claim 1, wherein the first information includes at least one operation parameter value for controlling an operation of the image forming apparatus, wherein a predetermined value range predetermined for each operation parameter corresponding to the at least one operation parameter value is stored in the image forming apparatus, wherein as the steps which the main controlling unit determines the operation controlling on the image forming apparatus based on the first information, the main controlling unit determines whether each value in the at least one operation parameter value is in the predetermined value range of the operation parameter corresponding to the each value or not, the main controlling unit stops an operation of the development unit, controls the image forming apparatus to stop an image forming operation and makes the image forming apparatus display an error message when at least one value in the at least one operation parameter value is not in the predetermined value range of the operation parameter corresponding to the at least one value, and the main controlling unit controls the operation of the image forming apparatus based on the at least one operation parameter value when the each value in the at least one operation parameter value is in the predetermined value range of the operation parameter corresponding to the each value.

4. The operation controlling method of the image forming apparatus according to claim 1, wherein the first information includes at least one operation parameter value for controlling an operation of the image forming apparatus, wherein in the image forming apparatus, a predetermined value range is predetermined for each operation parameter corresponding to the at least one operation parameter value and a predetermined operation parameter value is predetermined for each operation parameter corresponding to the at least one operation parameter value in the image forming apparatus, and each predetermined operation parameter value is in the predetermined value range of the operation parameter corresponding to the each predetermined operation parameter value, wherein as the step which the main controlling unit determines the operation controlling on the image forming apparatus based on the first information, the main controlling unit determines whether each value in the at least one operation parameter value is in the predetermined value range of the operation parameter corresponding to the each value or not, the main controlling unit regards a value in the at least one operation parameter value as the operation parameter value of a corresponding operation parameter of the image forming apparatus when the value in the at least one operation parameter value is in the predetermined value range of the corresponding operation parameter, the main controlling unit regards the predetermined operation parameter value corresponding to the corresponding operation parameter as the operation parameter value of the corresponding operation parameter of the image forming apparatus when the value in the at least one operation parameter value is not in the predetermined value range of the corresponding operation parameter, and the main controlling unit controls the operation of the image forming apparatus based on all determined operation parameter values of the image forming apparatus.

5. The operation controlling method of the image forming apparatus according to claim 1, wherein the first information includes a mode control information of the image forming apparatus.

6. The operation controlling method of the image forming apparatus according to claim 5, wherein the mode control information includes a mode control information for determining whether a cleaning mode is executed or not, wherein the main controlling unit controls the image forming apparatus to execute a cleaning operation when the mode control information is set for determining the cleaning mode is executed, and the main controlling unit does not control the image forming apparatus to execute the cleaning operation when the mode control information is set for determining the cleaning mode is not to be executed.

7. An image forming apparatus, wherein the image forming apparatus uses the operation controlling method of the image forming apparatus according to claim 1.

8. An image forming apparatus, wherein the image forming apparatus uses the operation controlling method of the image forming apparatus according to claim 1.

9. An image forming apparatus, comprising:

a storage unit configured to store a first information in a development unit, wherein the first information includes an identification code; and a main controlling unit configured to determine an operation controlling on the image forming apparatus based on the first information, wherein the first information includes an identification code, wherein the operation is determined when a power source is turned from OFF to ON when a cover of the image forming apparatus is closed, or when the cover of the image forming apparatus is changed from open to closed when the power source is ON.

10. An operation controlling method of an image forming apparatus provided with a main controlling unit and a development unit, storing a first information in the development unit, wherein the first information includes an identification code; and determining, by the main controlling unit, an operation controlling on the image forming apparatus based on the first information when a power source is turned from OFF to ON in a state of when a cover of the image forming apparatus is closed or when the cover of the image forming apparatus is changed from open to closed in a state of when the power source is ON, wherein the first information includes an identification code.

* * * * *